United States Patent [19]

Becker et al.

[11] 4,367,660

[45] Jan. 11, 1983

[54] WINDOW LIFT DRIVE

[75] Inventors: Herbert Becker, Coburg; Gerhard Schelhorn, Untersiemau; Manfred Sünkel, Sonnefeld, all of Fed. Rep. of Germany

[73] Assignee: Metallwerk Max Brose GmbH & Co., Fed. Rep. of Germany

[21] Appl. No.: 139,420

[22] Filed: Apr. 11, 1980

[30] Foreign Application Priority Data

Apr. 18, 1979 [DE] Fed. Rep. of Germany ....... 2915669

[51] Int. Cl.[3] .......................... F16H 1/16; F16H 1/20

[52] U.S. Cl. ........................................ 74/625; 74/411; 74/425

[58] Field of Search .................... 74/425, 625; 49/139, 49/140, 349, 350, 351; 308/36, 37

[56] References Cited

U.S. PATENT DOCUMENTS

| | | | |
|---|---|---|---|
| 516,489 | 3/1894 | Hunt | 308/37 |
| 1,876,654 | 9/1932 | Floraday | 49/350 |
| 2,230,756 | 2/1941 | Lohry | 49/349 |
| 2,848,218 | 8/1958 | Leslie et al. | 49/349 |
| 3,334,443 | 8/1967 | Eskra et al. | 49/349 |
| 3,554,045 | 1/1971 | Littmann | 49/349 |
| 3,706,236 | 12/1972 | Pickles | 49/349 |
| 4,085,629 | 4/1978 | Fogarollo | 74/625 |
| 4,167,834 | 9/1979 | Pickles | 49/349 |

*Primary Examiner*—Lawrence J. Staab

*Attorney, Agent, or Firm*—Fitch, Even, Tabin, Flannery & Welsh

[57] ABSTRACT

An electrical window lift drive especially for use in a motor vehicle, includes a drive housing, an electric motor attached to the housing having a shaft extending into the interior of the housing. A worm gear is mounted on the motor shaft for rotation thereby. A worm wheel is mounted for independent rotation coaxially with respect to a first portion of a bearing shaft inside the housing on a member intermediate the bearing shaft and the wheel. The bearing shaft is supported in the housing on both sides of the worm wheel and extends transversely of the motor shaft. The worm wheel meshes with and is driven by the worm gear. A drive member is mounted coaxially with respect to a second portion of the bearing shaft, and means are provided intermediate the worm gear and the drive member for transferring rotary motion of the worm gear to the drive member.

21 Claims, 3 Drawing Figures

WINDOW LIFT DRIVE

This invention relates generally to a drive for window lifts, particularly in electrically operated window lifts of the leverage type and of the cable line type as used in motor vehicles.

In known window lift drives a bearing shaft typically is mounted at one end in the drive housing. During operation of the window lift, relatively large forces act on a worm wheel mounted on the bearing shaft, particularly when the window is driven against a stop, such as occurs at full closing. Flexural torques are exerted by the worm wheel on the bearing shaft which stresses the bearing point of the bearing shaft on the drive housing. This results in increased wear and reduced life of the window lift drive.

Also during the operation of known window lifts, unpleasant noises may at times occur leading to complaints by the users of such window lifts. Generally, the cause for such unpleasant noise resides in mechanical vibrations which are disseminated over the entire window lift system which may be magnified through the mounting on the body of the motor vehicle.

Accordingly, it is an object of this invention to provide an electrically operated window lift drive that effectively bears the forces acting upon the rotating parts without undue stress on any of the parts or their mountings and accordingly substantially increase the reliable life expectancy.

It is another object of this invention to provide an electrically operated window lift drive that effectively controls the propagation of disturbing noises from the operating parts.

Other objects and advantages of the invention will become apparent and the invention better understood by reference to the following detailed description read in conjunction with the accompanying drawings in which.

This invention is described in connection with three embodiments, the first two of which are useful in window lifts of the leverage type and the third of which is useful in a window lift of the cable line type. The invention generally provides an electrical window lift drive especially for use in a motor vehicle, includes a drive housing, an electric motor attached to the housing having a shaft extending into the interior of the housing. A worm gear is mounted on the motor shaft for rotation thereby. A worm wheel is mounted for independent rotation coaxially with respect to a first portion of a bearing shaft inside the housing and on a member intermediate the bearing shaft and the worm wheel. The bearing shaft is supported in the housing on both sides of the worm wheel and extends transversely of the motor shaft. The worm wheel meshes with and is driven by the worm gear. A drive member is mounted coaxially with respect to a second portion of the bearing shaft, and means are provided intermediate the worm gear and the drive member for transferring rotary motion of the worm gear to the drive member.

Flexural torques occurring during operation that normally would affect the bearing shaft can be absorbed without major stress to the bearing shaft and to the bearing surfaces of the shaft at their positions of journaling in the drive housing. This substantially rules out any twisting of the bearing shaft, and the wear of the bearing surfaces in the drive housing during rotation of the bearing shaft is low. Because of these favorable mechanical conditions, it is possible to utilize less expensive material in the construction of the window lift drive. Further, prior art devices utilize a relatively long bearing bushing that protrudes beyond the drive housing, whereas the device according to the invention effectively dispenses with the need for such a large bearing bushing and results in a correspondingly reduced structural build-up or housing thickness of the window lift drive, especially in the portion containing the bearing shaft.

The assembly of the drive housing for this invention is facilitated by a two-part housing. An electric drive motor is rigidly connected to one of the parts.

Figure 1:
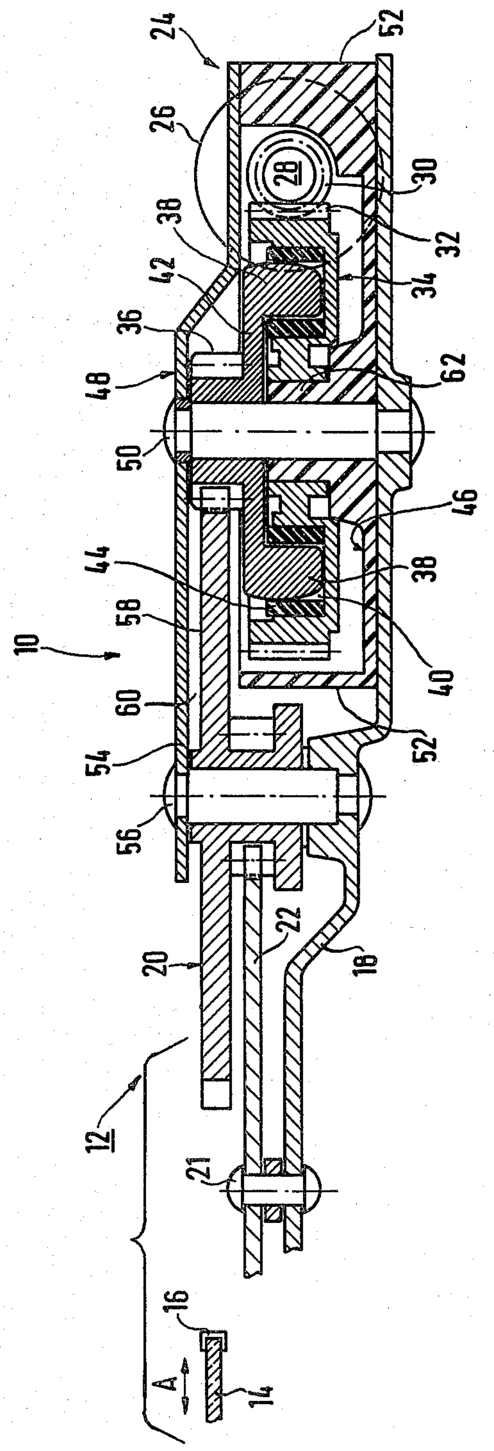
FIG. 1 is a partial sectional view through a first embodiment of a window lift drive according to the invention, especially useful for a leverage type window lift.

In this connection, and referring briefly to the embodiment shown in FIG. 1, the lower housing part is provided with an annular collar that protrudes into the interior of the drive housing. The bearing shaft is contained in this collar and the worm wheel is rotatably mounted on this collar. Thus, forces on the worm wheel transmitted to the hub of the wheel are applied directly to the rigid housing part. The bearing shaft is rigidly connected to each part of the drive housing, such as by riveting, and a drive pinion is rotatably mounted on the bearing shaft adjacent the worm wheel. The worm wheel includes at least one recess, and the drive pinion includes at least one drive claw which engages the recess of the worm wheel. Accordingly, the bearing shaft serves as a mounting but not a driving element, effectively eliminating any twisting forces on the shaft. Attenuation elements may be provided in the recesses to suppress the transmission of higher frequency vibrations from the worm wheel to the drive pinion. Further, such attenuation elements permit a certain extent of "give" between the drive pinion and the worm wheel in the nature of a spring force or elasticity. Such "give" between these parts absorbs shocks to the system as the starting torque of the motor overcomes the inertia of the lifting leverage system and when the mechanical advantage of the lifting leverage system may tend to drive the motor as it comes to a stop.

The structure affords not only a compact device, but also one in which the rotating parts are rigidly contained.

More particularly, and with reference to the embodiment illustrated in FIG. 1, a leverage window lift 12 is shown in part and includes a window lift drive 10. A window pane 14 is indicated at the left schematically and is provided along one edge with a channel 16. The leverage window lift 12 attaches by means of the channel 16 in accordance with conventional engineering principles to leverage parts (generally not shown) in such a manner that the window 14 can be moved back and forth in the longitudinal direction as indicated by the double arrow. A When the leverage window lift 12 is installed in a door of a motor vehicle as a part of a window regulator, it is used for the opening and closing of a car window. The direction A in such an instance is the vertical direction.

The window drive 10 is supported by a base plate 18 on which the parts of the lifting leverage system also are mounted. Of these lifting leverage system parts, a double sprocket wheel 20 and a tooth segment 22 are shown which are mounted respectively by a bearing bolt 56 and a double headed rivet 21 to the base plate 18.

A two-part drive housing 24 of the window lift drive 10 is also mounted on the base plate 18. An electric motor 26 whose circumferential line can be seen in FIG. 1, is mounted on the drive housing 24. A motor shaft 28 of the electric motor 26 protrudes into the drive housing 24. A worm gear 30 is securely mounted on the motor shaft 28 for rotation thereby, and it meshes with teeth 32 of a worm wheel 34 mounted for rotation coaxially with respect to a first portion of the bearing shaft 50. The axis of the worm wheel 34 is at right angles to the axis of the worm gear 30 and the motor shaft 28.

When the electric motor 26 is turned on, the motor shaft 28 and the worm gear 30 rotate, in turn causing the worm wheel 34 to rotate. The rotation of the worm wheel 34 is transmitted to a drive pinion 36 rotatably mounted coaxially with respect to and directly on a second portion of the bearing shaft 50. The teeth of the drive pinion engage the sprockets of a large wheel 58 of the double sprocket wheel 20. For the transmission of the rotary movement from the worm wheel 34 to the drive pinion 36, the worm wheel 34 is provided with four recesses 40 opening in the axial direction toward the drive pinion 36. Four protrusions or drive claws 38 extending in the axial direction toward the worm wheel engage these recesses 40, the claws 38 being integral with the distal end of four arms 42 that are arranged in a cruciform and are rigidly connected to the drive pinion 36. Thus, the worm wheels 34, the drive claws 38 and the drive pinion 36 all rotate together as a unit.

To provide for a certain amount of elasticity between the worm wheel 34 and the drive pinion 36 against the shock of a reverse acting force of any kind and to suppress the propagation of vibrations, each of the recesses 40 is provided with a lining 44 of elastic material, such a rubber. Spring members may be used in lieu of the lining, or in addition to it, to provide the elasticity between the worm wheel 34 and the drive pinion.

The drive housing 24, which accommodates the worm wheel 34 as well as the drive pinion 36 and protects them against outside contamination, includes a lower housing part 46 and an upper housing part 48. "Upper" and "lower" and similar terms as used herein are terms intended only to distinguish the illustrated parts and are not intended to define a required orientation. Both parts 46 and 48 are held together by a bearing shaft 50, one end of which is riveted to the upper housing part 48, and the other end of which is riveted to the base plate 18. The bottom side of the lower housing part 46 is affixed to the base plate 18 and by its nature forms a unit therewith and is provided with substantially a cylindrical upwardly flaring housing wall 52 which is reinforced in the area of the electric motor 26 to increase its stability. In this area, the upper part of the housing 48 also is formed in a double angular bend downwardly to the housing wall 52 in order to adhere to and form a seal with the housing wall 52.

The upper housing part 48 extends over and beyond the extent of the lower housing part 46 and includes the bearing bolt 56 of the double sprocket wheel 20. One end of the bearing bolt 56 is riveted firmly to this extension of the upper housing part 48 as indicated in 54. The other end of the bearing bolt 56 is riveted to the base plate 18. As shown in FIG. 1, the large sprocket wheel 58 of the double sprocket wheel 20 extends into the drive housing 24 through a slot 60 formed between the vertically extending housing wall 52 and the underside of the upper housing part 48 to mesh with the drive pinion 36.

The embodiment of the window lift drive 10 illustrated in FIG. 1 distinguishes itself by a particularly high stability, because both the bearing shaft 50 and the bearing bolt 56 are mounted for solid support at both their ends, so that twisting of the bearing shaft 50 and/or of the bearing bolt 56 against the drive housing 24 and the base plate 18 are substantially eliminated. The stability of the drive housing 24 against shearings is further enhanced by the bearing shaft 50 being contained within a circular collar 62 which has a wall thickness that significantly increases and then merges with the base of the lower housing part 46. To minimize the structural height in the axial direction of the bearing shaft 50, the parts are compactly arranged by mounting only the drive pinion 36 rotatably on the bearing shaft 50, whereas the worm wheel 34 is mounted on the cylindrical exterior area of the collar 62 immediately adjacent the drive pinion 36. Thus, the collar 62 provides housing structure to support the bearing shaft 50 and serves as a foundation for rotatably mounting the worm wheel 34. Forces that would act on the worm wheel hub thus are transmitted primarily to the housing structure rather than the shaft 50, enhancing strength as well as a compact structure.

The components of the described window lift drive 10 may be fabricated from metal or plastic. To suppress propagations of mechanical vibrations as far as possible from the electric motor 26 to the entire leverage system window lift 12, plastic parts preferably are combined with metal parts. Thus, the lower housing 46 may be formed of plastic, while the base plate 18 may be formed of either deep drawn or cast metal. It also is possible, however, to use a plastic base plate 18, in which instance the drive housing 24 could be fabricated of metal, such as an aluminum or zinc casting.

The window lever drive 10 shown in FIG. 1 is particularly appropriate for being mounted in doors of motor vehicles because of its compact structural build-up that provides a thin housing appropriate for mounting in door panels.

Figure 2:
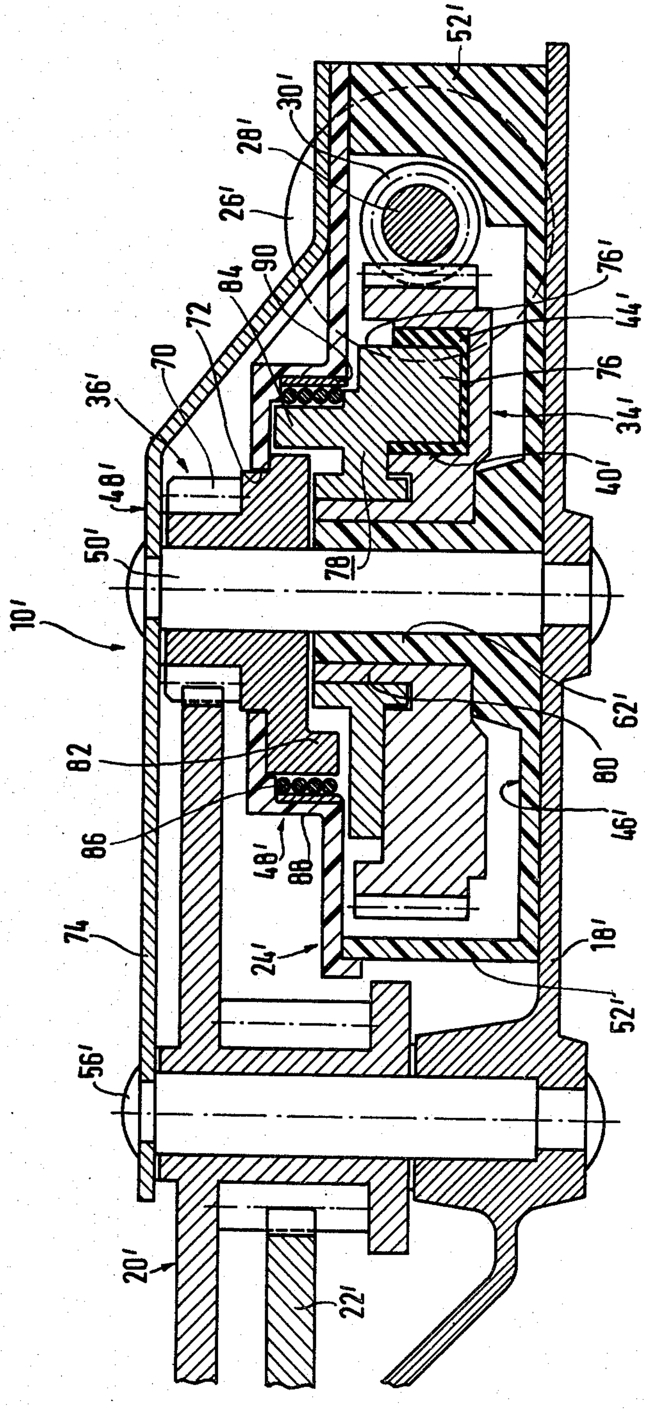
FIG. 2 is a partial sectional view through a second embodiment of the window lift drive according to the invention especially useful for a leverage type window lift.

In FIG. 2, a second embodiment of this invention is shown. Briefly as to this embodiment, it will be seen that a slot for the large sprocket wheel 58 has been dispensed with, and a completely sealed drive housing has been provided wherein the drive pinion extends through a bearing opening in the upper housing part, and the teeth of the drive pinion are arranged on the outside of the drive housing. The transmission of rotary movement from the worm wheel to the drive pinion is accomplished via protrusions or drive claws formed on the drive pinion within the drive housing and via opposite protruding members or counterclaws mounted in conjunction with the worm wheel. These counterclaws coact with the drive claws of the drive pinion through a loop spring brake. The use of the loop spring brake effectively allows one way transmission of power, i.e., the transmission of rotary movement from the worm wheel to the drive pinion while it resists the transmission of movement from the drive pinion to the worm wheel.

More particularly and referring to FIG. 2, there is illustrated another embodiment 10' of a window lift drive which differs from the embodiment 10 in FIG. 1 by a built-in loop spring brake and by a different drive housing structure, as described hereinafter. Parts in FIG. 2 corresponding to parts in FIG. 1 are identified by the same reference numeral followed by a prime mark (′).

In contrast to the window lift drive 10 in FIG. 1, the figure 10′ in FIG. 2 includes a drive housing 24′ that is closed on all sides, because a portion of the upper housing part 48′ forms a cap that adheres to and forms a seal with the housing wall 52′ all the way around. Thus, the interior of the housing is protected against outside contamination, including water. Further, the lubricant will not be lost from the drive housing 24′. The large wheel 58′ of the double sprocket wheel 20′ engages the drive pinion 36′ by meshing with pinion teeth 70 outside the confines of the drive housing 24′. The drive pinion 36′ is rotatably mounted directly on the second portion of the bearing shaft 50′ as before and in a bearing aperture 72 in the upper housing part 48′.

For the reinforcement of the window lift drive 10′, particularly for securely mounting the bearing bolt 56′ on its upper end, a cover plate 74 is provided that covers the drive pinion 36′ and part of the double sprocket wheel 20′. The cover plate 74 is riveted to both the bearing shaft 50′ and the bearing bolt 56′. In the area of the motor shaft 28′, the cover plate 74 is formed downwardly in a double angular bend to the upper housing part 48′, effectively forming a mounting extension of the housing 24′.

The worm wheel 34′ is formed similarly to the worm wheel 34 in FIG. 1. It is likewise provided with at least one recess 40′ into which at least one jaw 76 of the jaw part 78 engages. Elastic linings 44′ likewise are inserted in each of the recesses 40′.

Rather than separately mounting the jaw part 78 for rotation directly on the bearing shaft 50′, this jaw part is compactly mounted on a collar 80 of the worm wheel 34′ to reduce the structural build-up of the housing in this area. The jaw part 78 is adjacent the drive pinion 36′, which is rotatably mounted directly on the bearing shaft 50′.

At least one downwardly protruding jaw 82 is formed as an integral part of the drive pinion 36′ and is located within the drive housing 24′. At least one oppositely directed protrusion or counterclaw 84 of the jaw part 78 extends upwardly in the same area. Both the drive claws 82 of the drive pinion and the counterclaws 84 of the jaw part are in rotative connection through the means of a loop spring brake 86. The loop spring brake 86 is located radially between a cylindrical housing section 88 of the upper housing part 48′ and the claws 82 and 84. As indicated previously, the upper housing part 48 may be made of plastic, and in such instance, to improve the force of the frictional connection between the loop spring brake 86 and the upper housing part 48, a metallic friction bushing 90 is pressed into the housing section 88. The loop spring brake 86 is radially and outwardly biased against this friction bushing 90 so as to effectively prevent rotation in one direction.

The claws 82 and 84 coact in such a manner with inwardly bent ends of the loop spring brake 86 that when rotation is caused by the electric motor 26′ of the worm wheel 34′, the loop spring brake 36 is released and the drive pinion 36′ is caused to rotate, whereas under the condition of a back force on the system that would try to rotate the drive pinion 36′, the loop spring brake 86 expands against the friction bushing 90 and resists any further rotation in that direction.

The loop spring brake 86 is particularly advantageous when the mechanical advantage of the window lift is such that the window could drive or tend to drive the motor. Such mechanical advantage may depend on the rheostat setting of the electric motor 26 and/or 26′ and on the transmission ratios. With a double or more threaded worm 30′, the user of a loop spring brake 86 is preferable, while in the instance of a single threaded worm 30, the window lift drive 10 according to the embodiment in FIG. 1 can be used without a loop spring brake.

Figure 3:
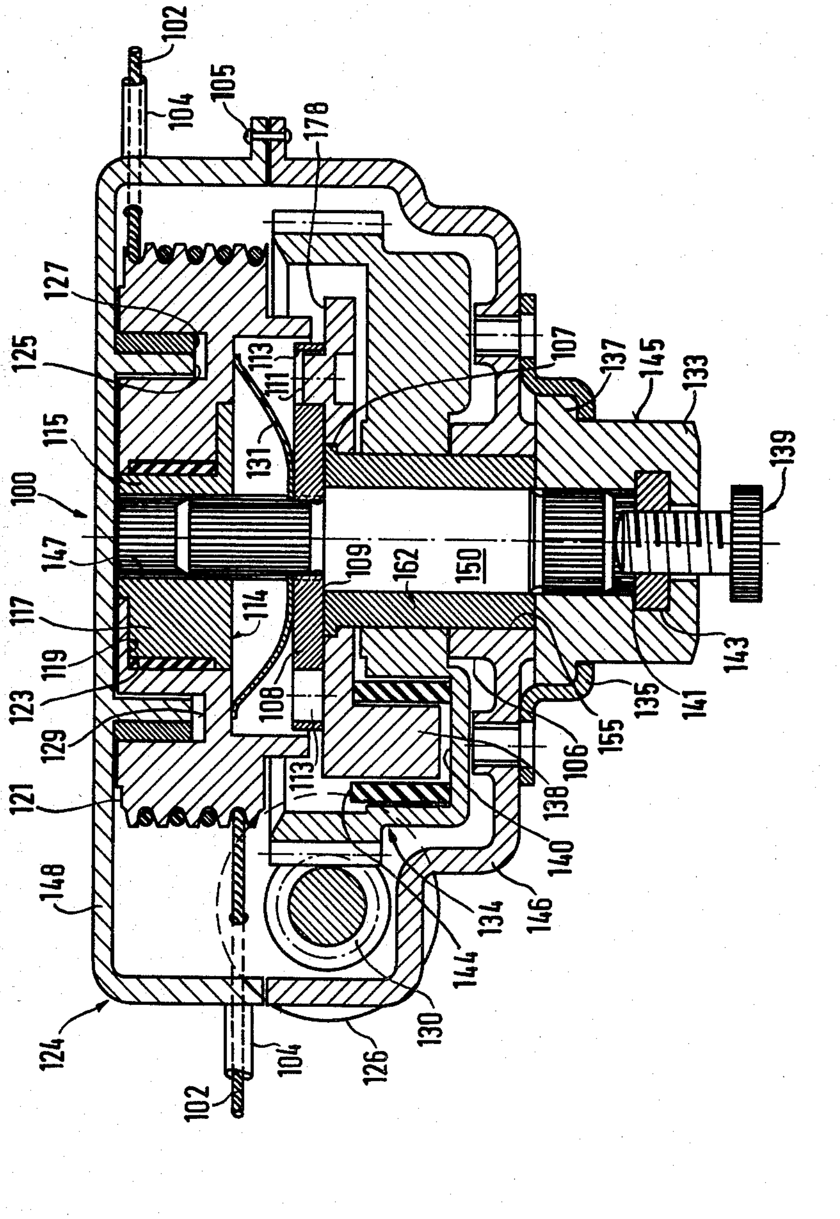
FIG. 3 is a sectional view of yet another embodiment of the window lift drive according to the invention, especially useful for a cable line type window lift.

A third embodiment of this invention is shown in FIG. 3. Briefly, the stable structure of the drive housing with reference to the bearing shaft being mounted on journaled at both its ends, makes it possible to provide for a disengagement or uncoupling of the worm wheel and drive member within the drive housing. The disengagement is provided in the form of a clutch which is actuated by an axial shifting of the bearing shaft.

In this instance, a simple clutch arrangement is provided between a protrusion or drive claw part and a perforated disc to effect a separation of these parts. The transmission of torque takes place via the bearing shaft mounted rotatably in the drive housing in an axially displaceable manner. The bearing shaft is interconnected or keyed to one of the clutch parts in such a manner that the shaft and this part rotate together while the shaft is axially displaceable. The structure that permits this is one or more splines or serrations that interlock with each other. The clutch part is biased by a spring to its normal or engaged position. The disengagement of the clutch parts is accomplished by means of a manual member located at one end of the bearing shaft and mounted to the housing. The member is capable of being manually threaded or screwed against the end of the bearing shaft to axially displace the shaft from the clutch member to disengage the electric power train. The bearing shaft thereafter can be manually rotated, which is advantageous in the event of an electrical power failure.

The drive member, or cable drum, is mounted within the housing and is mounted on the inside of an inwardly protruding portion of the upper housing part. The bearing shaft is carried in a bushing which in turn is carried in the lower housing part, and the drive torque transmission is effected through attenuating parts. There is effectively no twisting of the bearing shaft irrespective of the application of high flexural torques to the rotating parts.

More specifically and with relation to FIG. 3, there is shown a window lift drive 100 for a cable line type window lift. A cable line window lift includes a closed cable line loop or traction cable guided in a tube and operated by means of a drive. A window is then connected to the traction cable and is moved along by the traction cable. This illustrated embodiment includes a loop (endless) traction cable 102 and two guiding tubes 104 leading away from the window lift drive 100.

Components of the window lift drive 100 corresponding in function to components of the window lift 10 in FIG. 1 bear the same reference numerals augmented by the number 100.

The lower housing part 146 forms a seal with the upper housing part 148 and is connected thereto by a double headed rivet 105. The electric motor 126 depicted on the left side in FIG. 3 drives the worm wheel 134 via the worm gear 130. The worm wheel 134 is rotatably mounted coaxially with respect to a first portion of the bearing shaft 150 and directly on a bearing bushing 162. The bearing bushing 162 is pressed into an aperture 155 formed in a reinforced edge or collar 106 of the lower housing part 146. A first jaw part 178 is also mounted rotatably on the outer diameter of the bearing bushing 162 adjacent the mounting hub of the worm wheel 134 (above the worm wheel as illustrated in FIG. 3). The first jaw part 178 is prevented by a collar 107 from moving upwardly in the axial direction. The bearing shaft 150 is mounted in an axially displaceable manner within the bearing bushing 162.

Similarly as in the window lift drive 10 and 10′, the worm wheel 134 in the window lift drive 100 includes at least one recess 140 which is lined with an elastic lining 144 and engaged by at least one first protrusion or drive claw 138 on the underside of the first jaw part 178.

The first jaw part 178 is adjacent a perforated or foraminous disc 108 which is mounted on the bearing shaft 150 and is keyed thereto by one or more splines or serrations of the bearing shaft 150. At least one hole 113 is formed in the disc and receives at least one upwardly (as viewed in FIG. 3) directed axial protrusion 111 of the first jaw part 178, complementary to the hole. When an axial displacement of the bearing shaft 150 occurs in an upward direction, the foraminous disc 108 is also moved axially upwardly because of a ledge 109 on the bearing shaft 150. If in this manner the foraminous disc 108 is spaced far enough from the first jaw part 178, the axial protrusions 111 of the first jaw part 178 are disengaged from the holes 113. In such instance, the foraminous disc 108 and the bearing shaft 150 keyed to the disc will no longer be rotated by the worm wheel 134. Accordingly, a drive chain between the electric motor 126 and the traction cable 102 is interrupted, because the rotary movement can be transmitted only from the motor 126 and the worm wheel 134 to the traction cable 102 via the bearing shaft 150, as described in the following paragraphs.

The bearing shaft 150 is keyed in an axially displaceable manner via one or more splines or serrations to a second jaw part generally referred to at 114 and specifically with an aperture 147 in a body portion 115. The jaw body part 115 in turn engages at least one recess 119 provided in the cable drum 121 by means of at least one second drive claw 117. Several windings of the endless traction cable 102 are placed on the cable drum 121. Thus, a rotation of the bearing shaft 150 causes a rotation of the cable drum 121 and a longitudinal displacement of the cable 102.

The recesses 119 in the cable drum 121 are provided with an elastic lining 123 as are the recesses 140 in the worm wheel 134. The elasticity between the worm wheel 134 and the cable drum 121 and the attenuation of the vibrations are both correspondingly large. Hence, even high torques produced when the electric motor 126 is decelerated can be absorbed without severe shock to the operating parts.

The cable drum 121 is mounted on a cylindrical bearing bushing 127, which engages the outer wall of an annular groove 129 in the cable drum 121. The bearing bushing 127 is mounted on a complementary bearing collar 125 of the upper housing part 148.

The jaw body part 115 is coaxially mounted in the cable drum 121. While it will rotate the drum 121 when the bearing shaft 150 rotates, as already described, there is a slight "give" between the parts made possible by the attenuating part or lining 123. Thus, the upper end of the bearing shaft 150 shown in FIG. 3 is mounted to rotate the second jaw part 115 and the cable drum 121. The cable drum 121 is mechanically stable, because it is mounted on the upper housing part 148, and any bending tendency is not transferred to the bearing shaft 150. On the other hand, the bearing shaft 150 is mounted rotatably in the bearing bushing 162 which in turn is carried by the collar 106 in the lower housing part 146. Consequently, the bearing shaft 150 will not bend or damage its bearings even under major stresses.

A leaf spring 131 biases the foraminous disc 108 downwardly and is located axially between the cable drum 121 and the foraminous disc 108. Thus, the leaf spring 131 urges the bearing shaft 150 and the foraminous disc 108 downwardly to their normal positions wherein the worm wheel 134 is coupled to the cable drum 121.

In case of a failure of the electric motor 126, it is desirble to make it possible for the bearing shaft to be rotated independently of the electric motor 126 by manual operation. In order to axially move the bearing shaft 150 for disengagement of the clutch part, a disengagement member 133 is mounted rotatably on the lower housing part 146 by means of a stepped ring-shaped fastening member 135, which is connected in a suitable manner, such as by screws or rivets, to the lower housing part 146 and which grips the engagement member 133 by a guide extension 137. The bearing shaft 150 is keyed or splined to and axially displaceable in the disengagement member 133 via one or more splines or serrations. A disengagement screw 139 is threaded into the disengagement member 133 from the bottom, as indicated in FIG. 3, and it terminates at the lower frontal surface 141 of the bearing shaft 150. A threaded part 143 is provided within the disengagement member 133 for the guidance of the disengagement screw 139.

To effect disengagement of the electric motor 126 from the cable drum 121, the disengagement screw 139 is screwed into the disengagement member 133 until the bearing shaft 150 separates the foraminous disc 108 from the first jaw part. At that time, the window lift 100 can be actuated by rotation of the disengagement member 133, because the disengagement member 133 is keyed to the bearing shaft 150 which in turn is keyed to the cable drum 121 through the jaw part 115. To facilitate the manual rotation of the disengagement member 133 to manually rotate the cable drum 121 after the motor drive has been disengaged, the outer perimeter 145 is provided with a polygonal form, preferably the form of a hexagon.

To reengage the electric motor 126 with the cable drum, the disengagement screw 139 is unscrewed outwardly of the disengagement part 133. In the event that the holes 113 of the foraminous disc 108 and the corresponding axial protrusions 111 of the first jaw part 178 are not aligned at that moment, the axial protrusions 111 will subsequently snap into the holes 113 upon the actuation of the electric motor 126 which rotates the first jaw part 178 beneath (as viewed in FIG. 3) the foraminous disc 108, because this disc 108 along with the bearing shaft 150 is downwardly biased by the spring 131.

The drive housing 124 may be fabricated from metal, such as an aluminum casting, or plastic. The worm wheel 134 and the cable drum 121 also may be of metal or plastic material.

Summarizing, there has been provided in accordance with this invention an electrical window lift drive for a cable line type or leverage type window lift, especially for use in a motor vehicle, comprising a two-part drive housing, an electric motor having a motor shaft extending into the drive housing, a worm wheel mounted rotatably in the drive housing on a bearing shaft, the bearing shaft and worm wheel being independently rotatable of each other, the worm wheel meshing with a worm gear mounted on the motor shaft, and a drive member connected by means of an intermediate jaw clutch with the worm wheel, the drive member being either a cable drum for a drive cable for a cable line window lift or a drive pinion for meshing with operating parts of a lifting leverage system of a leverage type window lift.

It will be seen from the foregoing description that the illustrated embodiments of the invention provide an extremely simple window lift drive to fabricate and to assemble. The economics of this improved window lift drive is also apparent from the foregoing description. Additionally, the structure of the invention provides for reliable operation of the window lift drive over long periods of use and effectively eliminates undesirable noise propagation.

While the invention has been described in connection with a few preferred embodiments, alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

1. An electrical window lift drive especially for use in a motor vehicle, comprising:

a drive housing;

an electrical motor attached to said housing and having a shaft extending into the interior of said housing;

a worm gear mounted on the motor shaft for rotation thereby;

a worm wheel mounted for independent rotation coaxially with respect to a first portion of a bearing shaft and on elongated stationary bearing surface means fixed to said housing and independent of said bearing shaft intermediate said shaft and said wheel, said worm wheel meshing with and being driven by said worm gear and said bearing shaft being supported in said housing on both sides of said worm wheel;

a drive member mounted coaxially with respect to a second portion of said bearing shaft; and means intermediate said worm wheel and said drive member transferring rotary motion of said worm wheel to said drive member, said means including at least one arm attached to said drive member and extending radially outwardly therefrom, a protrusion at the distal end of said arm extending in an axial direction of the first portion of said bearing shaft, and at least one recess in said worm wheel engagedly receiving said protrusion, said recess including a lining of elastic material directly intermediate the engaging members.

2. A drive in accordance with claim 1 wherein said drive housing comprises first and second parts and wherein said motor is rigidly attached to said first part.

3. A drive in accordance with claim 2 further including an annular collar formed integral with said first housing part and protruding into the interior of said drive housing coaxially with respect to said bearing shaft, said bearing shaft extending through said collar.

4. A drive in accordance with claim 3 further including a bearing bushing pressed into the inner surface of said collar and supported thereby, said bearing shaft being movably contained within said bushing.

5. A drive in accordance with claim 4 wherein said drive member is a cable drum rotatably mounted on a bearing bushing carried on an inwardly protruding bearing collar of said second housing part coaxially with respect to said bearing shaft.

6. A drive in accordance with claim 5 further including clutch means within said drive housing intermediate said worm wheel and said cable drum for uncoupling said means that transfers rotary motion of said worm wheel to said cable drum.

7. A drive in accordance with claim 6 wherein a midportion of said bearing shaft has a cylindrical surface movably carried in said bearing bushing and wherein both end portions are splined, said bearing shaft being both rotatable and axially displaceable.

8. A drive in accordance with claim 7 wherein said means intermediate said worm wheel and said cable drum for transferring rotary motion therebetween includes at least one recess in said worm wheel;

a first jaw part rotatably mounted on said bearing bushing adjacent said worm wheel and having an axially extending protrusion engaging said recess in said worm wheel and an axially extending protrusion directed oppositely thereof in the direction of said cable drum;

a foraminous disc having a splined central aperture and being mounted on the splined end of said shaft intermediate said bearing bushing and said cable drum, the opening in said disc being engageable by jaw part protrusion directed toward said cable drum;

a leaf spring biasing said disc into engagement with said first jaw part;

at least one recess in said cable drum;

a second jaw part having a splined central aperture and mounted on the splined end of said shaft radially inwardly of said cable drum;

and a protrusion on said second jaw part extending axially into said recess in said cable drum.

9. A drive in accordance with claim 8 further including a lining of elastic material in all recesses.

10. A drive in accordance wiht claim 9 further including means mounted in said first housing part axially adjacent the end of said bearing shaft for causing axially displacement of said shaft and a shoulder means on said bearing shaft adjacent said foraminous disc, whereby when said shaft is caused to be axially displaced toward said cable drum, said disc will move against the tension of said spring and uncouple the engagement between said first jaw part and said foraminous disc.

11. A drive in accordance with claim 10 further comprising means rotatably connected to said first housing part axially of said bearing shaft and radially outwardly of said axial displacement means for manually rotating said shaft when said clutch means is disengaged, said manually rotatable means, including a splined central aperture for rotatably engaging said bearing shaft and a polygonal formed interior for gripping manually.

12. A drive in accordance with claim 4 wherein said elongated stationary bearing means intermediate said shaft and said wheel is said bearing bushing fixed in said collar and said worm wheel is mounted for independent rotation directly on a portion of said bearing bushing inwardly adjacent said collar.

13. A drive in accordance with claim 3 wherein said bearing shaft is non-rotatably mounted and wherein said drive member is a pinion mounted for rotation directly on the second portion of said bearing shaft for driving a leverage lift system.

14. A drive in accordance with claim 13 wherein said elongated fixed bearing surface means intermediate said shaft and said wheel is a portion of the outer surface of said collar protruding inwardly of the housing, said worm wheel being directly mounted for rotation thereon.

15. A drive in accordance with claim 14 wherein said pinion has an outer surface, a hub portion of which is rotatably mounted in a bearing aperture in said second housing part and said second housing part includes a cylindrical section wall forming a chamber containing a portion of said pinion inside the housing, and wherein said means intermediate said worm gear and said drive member includes at least one arm attached to said pinion extending radially outwardly from the pinion hub portion inside the housing;

- a protrusion at the distal end of the arm extending in the axial direction of said collar within the chamber;
- at least one recess in said worm wheel with opening facing axially in the direction of said pinion;
- a hub in the form of a collar on said worm wheel extending axially in the direction of and to a point adjacent said pinion;
- a jaw clutch rotatably mounted on the outer surface of said worm wheel hub, the body of said jaw clutch being generally intermediate the main body portions of said pinion and said worm wheel;
- at least one arm extending radially outwardly on said jaw clutch;
- oppositely directed protrusions extending axially in both directions from the distal end of said jaw clutch arm, the protrusion extending in the direction of said worm wheel engaging said recess in said worm wheel, and the protrusion directed toward said pinion extending into the chamber to coact with the protrusion of said pinion;
- a loop spring brake located radially between said cylindrical housing section wall and the pinion and jaw clutch protrusions in the chamber, said loop spring brake rotatively connecting said protrusions and being biased radially outwardly toward said cylindrical housing section wall, said loop spring brake expanding against said cylindrical section wall to resist any rotative movement tending to occur when back forces on the pinion urge rotation thereof and said brake being released from engagement with said cylindrical housing section wall to effectively couple the worm wheel for rotation with the jaw clutch when the driving forces come from said worm wheel.

16. A drive in accordance with claim 9 further including a friction bushing pressed into the interior of said housing section, said loop spring brake being radially and outwardly biased against said friction bushing.

17. A drive in accordance with claim 2 further comprising a base plate supporting both said drive housing and a lift lever system, said drive housing being mounted thereto by said first housing part.

18. A drive in accordance with claim 17 wherein at least said first housing part is made of metal and the base plate is made of plastic.

19. A drive in accordance with claim 17 wherein at least said first housing part is made of plastic and the base plate is made of metal.

20. An electrical window lift drive especially for use in a motor vehicle, comprising:

- a drive housing including first and second parts;
- an electric motor rigidly attached to said first housing part and having a shaft extending into the interior of said housing;
- a worm gear mounted on the motor shaft for rotation thereby;
- an annular collar formed in said first housing part and protruding into the interior of said drive housing;
- a bearing shaft extending inside said housing transversely of the motor shaft and coaxially with said annular collar, said bearing shaft extending through said collar;
- a bearing bushing pressed into the interior surface of said collar, said bearing shaft being movably contained within said bushing;
- a worm wheel mounted for independent rotation on said bearing bushing coaxially with respect to a first portion of said bearing shaft inside said housing, said worm wheel meshing with and being driven by said worm gear;
- a drive member mounted coaxially with respect to a second portion of said bearing shaft, said drive member being in the form of a cable drum rotatably mounted on a bearing bushing carried on an inwardly protruding bearing collar of said second housing part coaxially with respect to said bearing shaft; and
- means intermediate said worm wheel and said drive member transferring rotary motion of said worm wheel to said drive member.

21. An electrical window lift drive especially for use in a motor vehicle, comprising:

- a drive housing comprising first and second parts;
- an electric motor rigidly attached to the first part of said housing and having a shaft extending into the interior of said housing;
- a worm gear mounted on the motor shaft for rotation thereby;
- a worm wheel mounted for independent rotation coaxially with respect to a first portion of a bearing shaft and on support means independent of said bearing shaft intermediate said shaft and said wheel, said worm wheel meshing with and being driven by said worm gear and said bearing shaft being non-rotatably supported in said housing on both sides of said worm wheel;
- an annular collar formed in said first housing part and protruding into the interior of said drive housing coaxially with respect to said bearing shaft, said bearing shaft extending through said collar, said means intermediate said shaft and said wheel being a portion of the outer surface of said collar protruding inwardly of the housing and said worm wheel being directly mounted for rotation thereon;
- a drive member mounted coaxially with respect to a second portion of said bearing shaft, said drive member being a pinion mounted for rotation directly on the second portion of said bearing shaft for driving a leverage lift system, said pinion having an outer surface, a hub portion of which is rotatably mounted in a bearing aperture in said second housing part and said second housing part includes a cylindrical section wall forming a chamber containing a portion of said pinion inside the housing;

means intermediate said worm wheel and said drive member transferring rotary motion of said worm wheel to said drive member, said means intermediate said worm gear and said drive member including at least one arm attached to said pinion extending radially outwardly from the pinion hub portion inside the housing;

a protrusion at the distal end of the arm extending in the axial direction of said collar within the chamber;

at least one recess in said worm wheel with opening facing axially in the direction of said pinion;

a hub in the form of a collar on said worm wheel extending axially in the direction of and to a point adjacent said pinion;

a jaw clutch rotatably mounted on the outer surface of said worm wheel hub, the body of said jaw clutch being generally intermediate the main body portions of said pinion and said worm wheel;

at least one arm extending radially outwardly on said jaw clutch;

oppositely directed protrusions extending axially in both directions from the distal end of said jaw clutch arm, the protrusion extending in the direction of said worm wheel engaging said recess in said worm wheel, and the protrusion directed toward said pinion extending into the chamber to coact with the protrusion of said pinion;

a loop spring brake located radially between said cylindrical housing section wall and the pinion and jaw clutch protrusions in the chamber, said loop spring brake rotatively connecting said protrusions and being biased radially outwardly toward said cylindrical housing section wall, said loop spring brake expanding against said cylindrical section wall to resist any rotative movement tending to occur when back forces on the pinion urge rotation thereof and said brake being released from engagement with said cylindrical housing section wall to effectively couple the worm wheel for rotation with the jaw clutch when the driving forces come from said worm wheel.

* * * * *